US 6,531,431 B2

(12) United States Patent
Mohri et al.

(10) Patent No.: US 6,531,431 B2
(45) Date of Patent: *Mar. 11, 2003

(54) PIVOT ASSEMBLY BEARING

(75) Inventors: Yasuhiro Mohri, Nagano-ken (JP); Motoharu Akiyama, Nagano-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/761,989

(22) Filed: Jan. 16, 2001

(65) Prior Publication Data
US 2001/0012822 A1 Aug. 9, 2001

(30) Foreign Application Priority Data
Jan. 21, 2000 (JP) ........................................ 2000-048279

(51) Int. Cl.$^7$ .................. C10M 105/54; C10M 133/16; C10M 133/38
(52) U.S. Cl. .................. 508/551; 508/259; 508/555; 508/582
(58) Field of Search ................. 508/551, 555, 508/582; 564/209, 210

(56) References Cited

U.S. PATENT DOCUMENTS

| 4,174,461 A | * | 11/1979 | Sianesi et al. | 568/582 |
| 4,438,006 A | * | 3/1984 | Snyder, Jr. et al. | 508/582 |
| 5,124,058 A | * | 6/1992 | Corti et al. | 508/582 |
| 5,154,845 A | * | 10/1992 | Williams | 508/582 |
| 5,571,779 A | * | 11/1996 | Kleiner et al. | 508/153 |
| 5,663,127 A | * | 9/1997 | Flynn et al. | 508/250 |
| 5,672,765 A | * | 9/1997 | Marhold et al. | 568/426 |
| 5,863,875 A | * | 1/1999 | Steckel | 508/551 |
| 6,054,211 A | * | 4/2000 | Fukuchi | 428/336 |
| 6,420,321 B1 | * | 7/2002 | Akiyama et al. | 508/259 |

FOREIGN PATENT DOCUMENTS

| JP | 05230000 A | * | 9/1993 |
| JP | 2000128985 A | * | 5/2000 |
| JP | 2000-227121 | | 8/2000 |
| JP | 2001207186 A | * | 7/2001 |

* cited by examiner

Primary Examiner—Ellen M. McAvoy
(74) Attorney, Agent, or Firm—Flynn, Thiel, Boutell & Tanis, P.C.

(57) ABSTRACT

A fluorine-based oil composition for actuator roller bearings comprising (A) a fluorine-based oil and (B) a fluorinated ether diamide compound at a ratio by weight of 80 to 99.1:20 to 0.1. This composition is much better in torque, outgas and life than existing oil compositions.

6 Claims, 1 Drawing Sheet

Width

PIVOT ASSEMBLY BEARING

BACKGROUND OF THE INVENTION

1. Field of the Invention

The present invention relates to a pivot assembly (hereinafter referred to as ass'y) bearing in which a fluorine-based oil composition is sealed up. More particularly, the present invention pertains to a pivot ass'y bearing in which a fluorine-based oil composition is sealed up, and which has low torque, low outgas, a long service life and excellent hysteresis characteristics.

2. Description of the Prior Art

In bearings for pivot ass'y, many studies have been recently made in order to develop bearings providing low torque, low outgas, a long service life and excellent hysteresis characteristics. The ability of recent computers has been improved because a variety of proposals have been made for high densification and high-speed performance to cope with a drastic increase in memory capacity and read velocity. At present, however, still much possibility for improvement remains.

SUMMARY OF THE INVENTION

It is an objective of the present invention to develop a pivot ass'y bearing for an apparatus which writes and reads out information in an information apparatus such as HDD (hard disc drive), FDD (floppy disc drive) memories, CDD (compact disc drive), MOD (magneto-optical disc drive) and the like of computer systems, said pivot ass'y bearing meeting requirements such as low torque, low outgas, a long service life and excellent hysteresis characteristics.

By the term "a pivot ass'y bearing" as used in the present invention is meant a bearing which is used to drive an actuator for writing and reading out information used in a peripheral information apparatus such as HDD (hard disc drive), FDD (floppy disc drive) memories, CDD (compact disc drive), MOD (magneto-optical disc drive) and the like of computer systems. The present invention has been contrived in order to provide a pivot ass'y bearing which is surpassingly excellent in low torque, low outgas, a long service life and excellent hysteresis characteristics compared to conventional pivot ass'y bearings.

Extensive studies have been made by the inventors on the development of bearings having such favorable characteristics as mentioned above, and as a result, found that good results are obtained when a fluorine-based oil composition which is characterized by comprising an additive of a specific chemical structure and a fluorine-based oil is sealed in a pivot ass'y bearing. The invention is accomplished based on the above finding.

A typical pivot ass'y bearing according to the present invention is illustrated in FIG. 1, wherein the symbols stand as described in the following:
1; outer race, 2; ball, 3; inner race 4; chamfered face of inner race, 5; retainer, 6; chamfered face of outer race, 7; shield, 8; snap ring, d; inside diameter of bearing, Li; diameter of inner race shoulder, Lo; diameter of outer race shoulder, D; outside diameter of bearing. Bearing space volume means the residual space volume obtained by subtracting the solid volumes of the balls and retainers from the space volume encompassed by the inner race, outer race and shield.

In addition, a magnetic disc apparatus which incorporates the pivot ass'y bearing according to the present invention is illustrated in FIG. 2, wherein the symbols stand as described in the following: 10; pivot shaft, 20; swing arm 30; magnetic head, 40; drive unit, 50; magnetic disc, 60; clamp, 70; rotational shaft of spindle motor, 80; housing.

When a drive pulse is entered into the magnetic disc apparatus, the drive unit 40 causes the swing arm 20 supported by the pivot shaft 10 to swing, and the magnetic head 30 radially traverses from the inner circumference to the outer circumference or vice versa so as to carry out reading or writing of information.

The swing angle of the swing arm 20 at the time of swinging is in the range of 20 to 30 degrees.

The hysteresis characteristics as mentioned in the present invention is the characteristic when the magnetic head 30 moves back and forth one time through the same route.

EMBODIMENTS OF THE INVENTION

Figure 1:
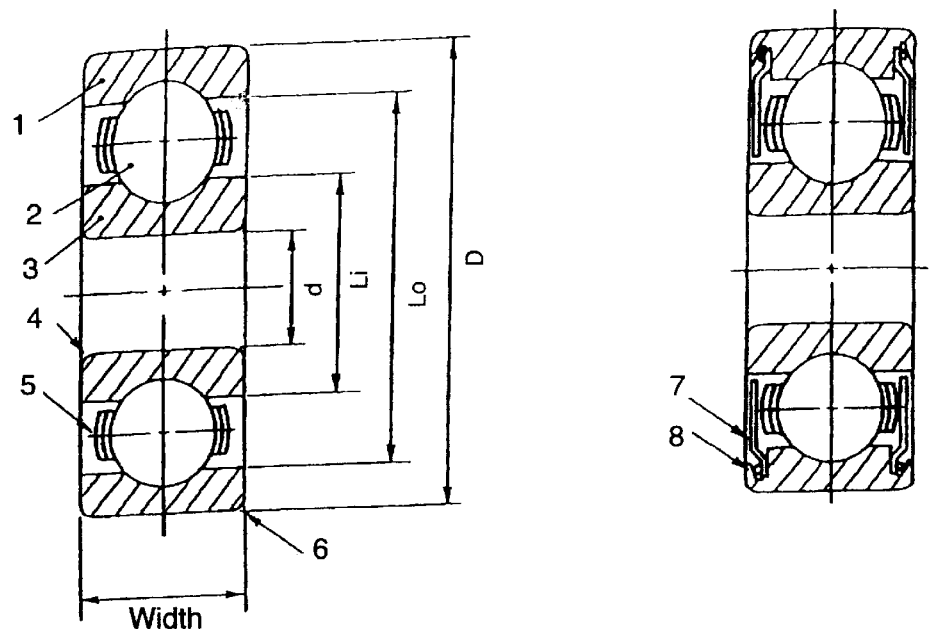
FIG. 1 is a cross-sectional view of a typical pivot ass'y bearing according to the present invention.
Figure 2:
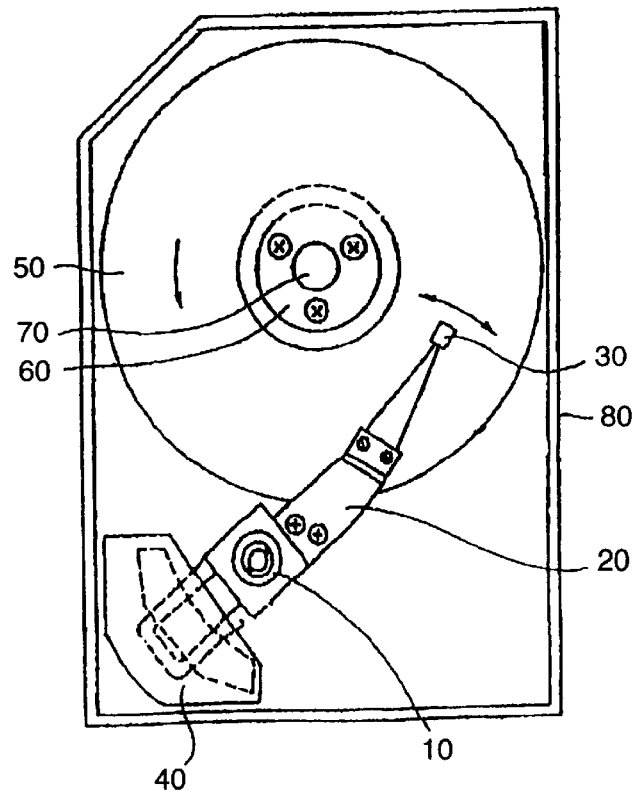
FIG. 2 is a sketch drawing of a typical magnetic disc apparatus.

The composition of the invention, which comprises a fluorine-based oil and an additive having a specific type of chemical structure, is novel in its combination. The amount of additives having a specific type of chemical structure is in the range of 0.1 to 20 wt % of the entire oil composition. Preferably, the amount ranges from 1 wt % to 5 wt %.

If the amount is less than 0.1 wt %, there is the apprehension that the resultant oil composition becomes so high in surface tension that it cannot be permeated throughout a bearing. In contrast, when the additive is added to in amounts exceeding 20 wt %, not only the lowering of surface tension is not observed, but also the oil composition unfavorably becomes high in viscosity.

It will be noted that the fluorinated ether diamide is a known one and a variety of preparation processes may be considered, among which it is preferred to prepare the compound from a compound having a carboxyl group at terminals of a fluorinated ether molecule and a diamine compound.

The fluorine oil should preferably have a molecular weight of about 1,000 to about 10,000. If the molecular weight is lower than 1,000, the oil is liable to evaporate, resulting in a poor outgas characteristic. Over 10,000, the viscosity becomes high, thus leading to a high torque.

Further, the fluorine-based oil composition according to the invention may comprise various types of additives employed in ordinary fluorine-based oil compositions.

More particularly, mention is made, as additives used in ordinary fluorine-based oil compositions, of antioxidants such as phenyl-α(β)-naphthylamine, alkyldiphenylamines, phenothiazine, t-butylphenol and the like, metal sulfonates, nonionic and amine rust inhibitors, and the like.

Preferred embodiments of the invention are described below.

(1) A pivot ass'y bearing in which oil composition is sealed up comprising:

(A) a fluorine-based oil; and (B) an additive of the general formula (i)

$$Z-Y-Z \qquad (i)$$

wherein Z represents a fluorinated ether group of the formula (ii)

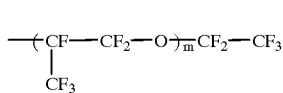
(ii)

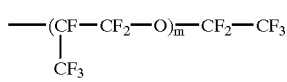
(ii)

in which m is an integer of 1 to 50, and Y represents an aliphatic diamido group of the general formula (iii)

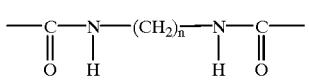
(iii)

in which n is an integer of 1 to 30, or an alicyclic diamido group of the general formula (iv)

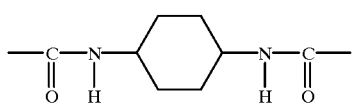
(iv)

or an aromatic diamido group of the general formula (v)

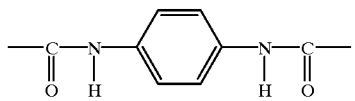
(v)

or a cyclic diamido group of the general formula (vi)

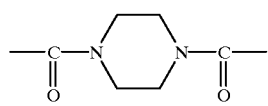
(vi)

(2) A pivot ass'y bearing in which oil composition is sealed up comprising:
(A) a fluorine-based oil composed of a fluorinated ether of the general formula (vii)

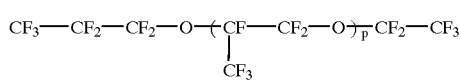
(vii)

wherein p is an integer of 6 to 100; and (B) a fluorinated ether diamide additive of the general formulae (ii) and (iii)

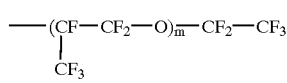
(ii)

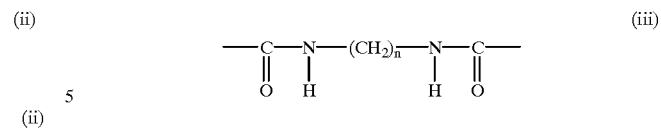
(iii)

(3) A pivot ass'y bearing in which oil composition is sealed up comprising:
(A) a fluorine-based oil composed of a fluorinated ether of the general formula (vii)

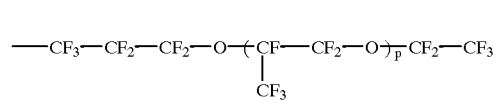
(vii)

wherein p is an integer of 6 to 100; and (B) a fluorinated ether alicyclic diamide additive of the general formulae (ii) and (iv)

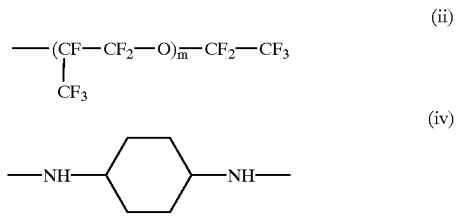

(4) A pivot ass'y bearing in which oil composition is sealed up comprising:
(A) a fluorine oil composed of a fluorinated ether of the general formula (vii)

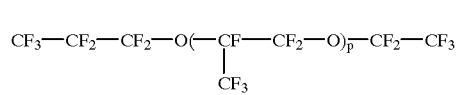
(vii)

wherein p is an integer of 6 to 100; and (B) a fluorinated ether aromatic diamide additive of the general formulae (ii) and (v)

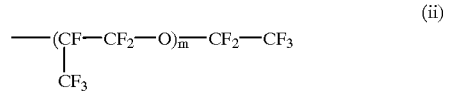
(ii)

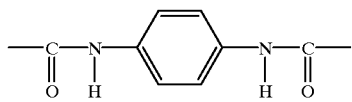
(v)

(5) A pivot ass'y bearing in which oil composition is sealed up comprising:
(A) a fluorine oil composed of a fluorinated ether of the general formula (vii)

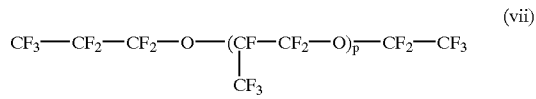
(vii)

wherein p is an integer of 6 to 100; and (B) a fluorinated ether cyclic diamide additive of the general formulae (ii) and (vi)

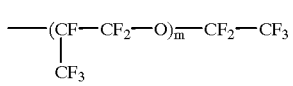
(ii)

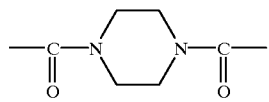
(vi)

(6) A pivot ass'y bearing as recited in any one of 1 to 5 above in which oil composition is sealed up, wherein a ratio by weight between the fluorine-based oil (A) and the additive (B) is at 80 to 99.1:20 to 0.1.

(7) A pivot ass'y bearing as recited in any one of (1) to (6) above, wherein the fluorine-based oil (A) has an average molecular weight of 1,000 to 10,000.

(8) A pivot ass'y bearing as recited in any one of (1) to (7) above, wherein the oil composition has a viscosity ranging from 5 to 2,000 mm²/second.

(9) A pivot ass'y bearing as recited in any one of (1) to (8) above, wherein the oil composition further comprises an antioxidant and a rust inhibitor.

(10) A fluorine-based oil composition for actuator roller bearings as recited in any one of (1) to (9) above, wherein the oil composition is sealed in at a bearing space capacity of 2 to 55 vol %.

The invention is more particularly described by way of example, which should not be construed as limiting the invention thereto.

EXAMPLES

Four types of fluorine-based base oil compositions were obtained while making use of compounds of the general formula (vii) wherein p in the formula was so controlled as to provide different molecular weights, i.e. average molecular weights of (a) 1500 to 2500, (b) 2500 to 3500, (c) 3000 to 4000, and (d) 7000 to 8000.

The characteristics of the compositions are shown in Table 1. For comparison, the characteristics of a polyol ester (e) are also shown.

TABLE 1

| | a | b | c | d | e |
|---|---|---|---|---|---|
| Average molecular weight | 1500 to 2500 | 2500 to 3500 | 3000 to 4000 | 7000 to 8000 | 500 to 700 |
| Kinetic viscosity 40° C., (mm²/s) | 25 | 60 | 95 | 390 | 18 |
| Viscosity index | 85 | 130 | 130 | 140 | 130 |
| Pour point (° C.) | −60 | −55 | −45 | −30 | −40 |
| Density 20° C. (g/l) | 1.88 | 1.89 | 1.89 | 1.90 | 0.9 |
| Evaporation loss 150° C. × 24 hours | 35% | 10% | 2% | 0% | 50% |
| Surface tension 20° C. (dynes/cm) | 21 | 22 | 22 | 23 | 35 |
| Coefficient of friction | 0.16 | 0.15 | 0.16 | 0.15 | 0.17 |

The specimen were, respectively, evaluated according to the following method.

In Preparatory Examples 1 to 6, a fluorine-based oil composition was a fluorinated ether of the general formula (vii)

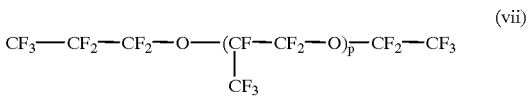
(vii)

As an additive, there was used a fluorinated ether aliphatic diamide additive (F1) represented by the formulae (ii) and (iii)

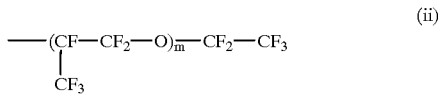
(ii)

wherein m =15 to 25, and

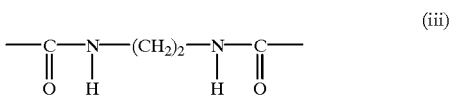
(iii)

Wherein n=2
weight between the fluorine-based oil and the additive of 80 to 99.1: 20 to 0.1 to provide fluorine-based oil composition.

In Preparatory Examples 7 to 10 of fluorine-based oil composition, there were obtained the fluorine-based oil composition in the same manner as in Preparatory Example 1 except that a fluorinated ether aliphatic diamide (F2) of the general formula (iii) wherein n =6 was used as the additive of the component (B).

In Preparatory Examples 11 to 14 of fluorine-based oil composition, there were obtained the fluorine-based oil composition in the same manner as in Preparatory Example 1 except that a fluorinated ether aliphatic diamide (F3) of the general formula (iii) wherein n =10 was used as the additive of the component (B).

In Preparatory Examples 15 to 17 of fluorine-based oil composition, there were obtained the fluorine-based oil composition in the same manner as in Preparatory Example 1 except that a fluorinated ether cyclohexyldiamide (F4) was used as the additive of the component (B).

In Preparatory Examples 18 to 20 of fluorine-based oil composition, there were obtained the fluorine-based oil composition in the same manner as in Preparatory Example 1 except that a fluorinated ether p-aminoaniline diamide (F5) was used as the additive of the component (B).

In Preparatory Examples 21 to 23 of fluorine-based oil composition, there were obtained the fluorine-based oil composition in the same manner as in Preparatory Example 1 except that a fluorinated ether piperazinediamide (F6) was used as the additive of the component (B).

The formulation ingredients and ratios are shown in Table 2.

TABLE 2

| Preparatory Example | Base Oil | Additive | Ratio of Additive (mass %) | Coefficient of Friction |
|---|---|---|---|---|
| 1 | a | F1 | 1.0 | 0.13 |
| 2 | b | F1 | 1.0 | 0.13 |
| 3 | b | F1 | 3.0 | 0.12 |
| 4 | b | F1 | 5.0 | 0.12 |
| 5 | c | F1 | 10.0 | 0.12 |
| 6 | d | F1 | 15.0 | 0.11 |
| 7 | a | F2 | 3.0 | 0.12 |
| 8 | b | F2 | 5.0 | 0.12 |
| 9 | c | F2 | 13.0 | 0.12 |
| 10 | b | F2 | 18.0 | 0.13 |
| 11 | b | F3 | 0.5 | 0.13 |
| 12 | a | F3 | 5.0 | 0.12 |
| 13 | b | F3 | 7.0 | 0.12 |
| 14 | d | F3 | 9.0 | 0.13 |
| 15 | b | F4 | 0.5 | 0.13 |
| 16 | c | F4 | 3.0 | 0.12 |
| 17 | a | F4 | 7.0 | 0.12 |
| 18 | c | F5 | 5.0 | 0.12 |
| 19 | a | F5 | 7.0 | 0.12 |
| 20 | d | F5 | 10.0 | 0.12 |
| 21 | a | F6 | 0.1 | 0.13 |
| 22 | c | F6 | 3.0 | 0.12 |
| 23 | b | F6 | 20.0 | 0.13 |
| Comparative Example 1 | a | nil | Nil | 0.16 |
| Comparative Example 2 | b | nil | Nil | 0.15 |
| Comparative Example 3 | c | nil | Nil | 0.16 |
| Comparative Example 4 | a | F2 | 30.0 | 0.17 |
| Comparative Example 5 | a | Formula (viii) | 2.0 | 0.18 |
| Comparative Example 6 | b | Formula (ix) | 3.0 | 0.16 |
| Comparative Example 7 | b | Formula (x) | 1.0 | Not dissolved |
| Comparative Example 8 | c | Formula (xi) | 7.0 | 0.15 |
| Comparative Example 9 | c | Formula (xi) | 2.0 | 0.15 |
| Comparative Example 10 | e formula(xii) | Nil | Nil | 0.17 |
| Comparative Example 11 | e formula(xii) | F1 | 5.0 | 0.16 |

The coefficient of friction was measured using the Soda-type pendulum friction tester. The Soda-type pendulum friction tester is one wherein a sample oil was placed at the friction portion of a fulcrum of the pendulum, after which the pendulum was vibrated and the coefficient of friction at the fulcrum portion was calculated from the degree of attenuation of the pendulum. The measuring conditions included one vertical thread load of 40 g, two horizontal thread loads each of which was at 80 g, an initial amplitude of 0.5 radians, and a test temperature of room temperature.

COMPARATIVE EXAMPLES

For comparison, there were prepared fluorine-based oil composition for actuator roller bearings in the same manner as in the Preparatory Examples for the fluorine-based oil compositions except that no additive was used or additives other than those of the invention were used as the additive of component (B). These are shown in Table 2 as Comparative Examples.

In Comparative Examples 1 to 3, there were prepared fluorine-based oil compositions for actuator roller bearings without use of any additive.

In Comparative Example 4, a fluorine-based oil composition for actuator roller bearings was prepared using a large amount of F2.

In Comparative Example 5, there was prepared a fluorine-based oil composition for actuator roller bearings in the same manner as in Preparatory Examples except that an additive of the chemical formula (viii) was used.

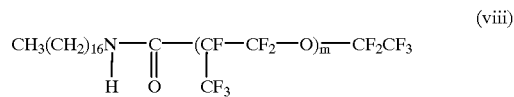

(viii)

In Comparative Example 6, there was prepared a fluorine-based oil composition for actuator roller bearings in the same manner as in Preparatory Examples except that an additive of the chemical formula (ix) was used.

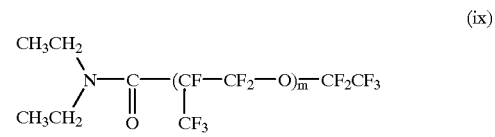

(ix)

In Comparative Example 7, there was prepared a fluorine-based oil composition for actuator roller bearings in the same manner as in Preparatory Examples except that an additive of the chemical formula (x).

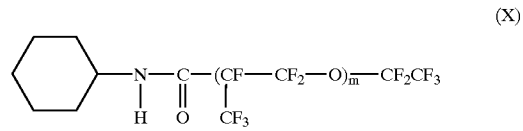

(x)

In Comparative Examples 8 and 9, there were prepared fluorine-based oil compositions for actuator roller bearings in the same manner as in Preparatory Examples except that an additive of the chemical formula (xi) was used.

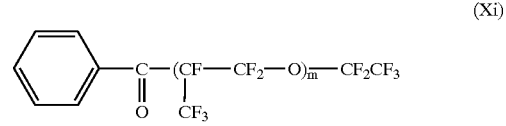

(xi)

In Comparative Example 10, a fluorine-based oil composition for actuator roller bearings was prepared using a base oil represented by the chemical formula (xii), but not using any additive.

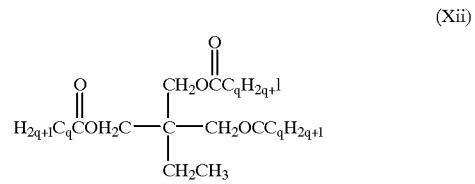

(xii)

wherein q is an integer of 6 to 10.

In Comparative Example 11, there was prepared a fluorine-based oil composition for actuator roller bearings in the same manner as in Preparatory Examples using the polyester (e) as a base oil and F1 as an additive.

Examples 1 to 23

The fluorine-based oil compositions which were prepared in the preparatory examples and the comparative examples, respectively were each sealed in the pivot ass'y bearing according to the present invention in an amount of 5% by volume based on the bearing space volume, and subsequently bearing characteristics tests were repeated. The results are given in Table 3.

TABLE 3

| Example | Torque of Rotation | Outgas | Initial hysteresis | Overall evaluation |
|---|---|---|---|---|
| 1 | ○ | ○ | ◎ | ○ |
| 2 | ◎ | ◎ | ◎ | ◎ |
| 3 | ◎ | ◎ | ◎ | ◎ |
| 4 | ◎ | ◎ | ◎ | ◎ |
| 5 | ◎ | ◎ | ○ | ○ |
| 6 | ◎ | ◎ | ○ | ○ |
| 7 | ○ | ○ | ◎ | ○ |
| 8 | ◎ | ◎ | ◎ | ◎ |
| 9 | ◎ | ◎ | ○ | ○ |
| 10 | ◎ | ◎ | ◎ | ◎ |
| 11 | ◎ | ◎ | ◎ | ◎ |
| 12 | ◎ | ○ | ◎ | ○ |
| 13 | ◎ | ◎ | ◎ | ○ |
| 14 | ◎ | ◎ | ○ | ○ |
| 15 | ◎ | ◎ | ◎ | ◎ |
| 16 | ◎ | ◎ | ◎ | ◎ |
| 17 | ○ | ○ | ◎ | ○ |
| 18 | ◎ | ◎ | ◎ | ◎ |
| 19 | ◎ | ○ | ◎ | ○ |
| 20 | ◎ | ◎ | ○ | ○ |
| 21 | ○ | ○ | ◎ | ○ |
| 22 | ◎ | ◎ | ◎ | ◎ |
| 23 | ◎ | ◎ | ◎ | ◎ |
| Comparative Example 1 | Δ | ○ | ◎ | Δ |
| 2 | Δ | ◎ | ◎ | Δ |
| 3 | Δ | ◎ | ◎ | Δ |
| 4 | × | ○ | ◎ | × |
| 5 | × | ○ | ◎ | × |
| 6 | × | ◎ | ◎ | × |
| 7 | × | ○ | ◎ | × |
| 8 | × | ◎ | ○ | × |
| 9 | × | ◎ | ◎ | × |
| 10 | ◎ | × | ◎ | × |
| 11 | ◎ | × | ○ | × |

In the bearing characteristics tests, measurements were made of rotational torque, hysteresis characteristics and outgas characteristics of said pivot ass'y bearing by sealing therein each of the fluorine-based oil compositions as the sample for evaluation.

The rotational torque was measured by use of a torque tester in the state of a fixedly bonded pivot ass'y bearing under a given load pressure at the number of rotations of 2 r.p.m., at room temperature. The outgas characteristic was measured according to a dynamic head space method using several milligrams of each sample.

The hysteresis characteristics as mentioned in the present invention is the characteristics when the magnetic head 30 moves back and forth one time through the same route. Thus, the evaluation test was carried out by measuring the electric current value of the offset current when the magnetic head 30 moves from the inside to the outside through a route on the magnetic disc and then from the outside to the inside through the route same as the above thereon.

The rotational torque is improved with decreased torque, the outgas characteristics are improved with decreased outgas, and the hysteresis characteristics become excellent with decreased variation in the electric current value of the offset current.

◎: Excellent
○: Good
Δ: Moderate
×: Poor

As it is obvious from Tables 3 and 4, it has been enabled to confirm that the pivot ass'y bearing in which a fluorine-based oil composition is sealed up and which is employed in the present invention, is surpassingly excellent in low torque, low outgas, a long service life and hysteresis characteristics as compared with conventional pivot ass'y bearings in which a polyol eater-based oil composition is sealed up.

What is claimed is:

1. A pivot assembly bearing in which an oil composition is sealed, said oil composition comprising:

(A) a fluorinated ether-based oil; and (B) an additive of the general formula (i)

$$Z-Y-Z \quad (i)$$

wherein Z represents a fluorinated ether group of the formula (ii)

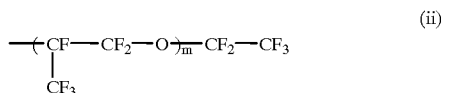

(ii)

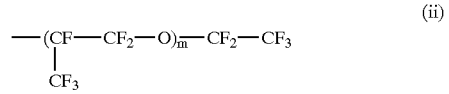

(ii)

in which m is an integer of 1 to 50, and Y represents an aliphatic diamido group of the general formula (iii):

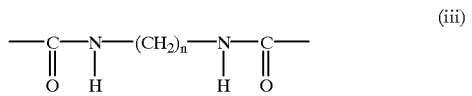

(iii)

in which n is an integer of 1 to 30, or an alicyclic diamido group of the general formula (iv)

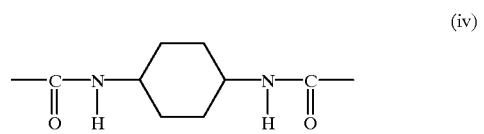

(iv)

or an aromatic diamido group of the general formula (v)

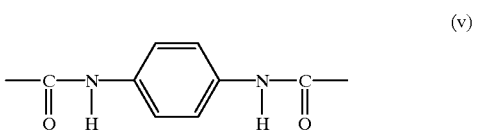

(v)

or a cyclic diamido group of the general formula (vi)

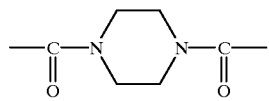
(vi)

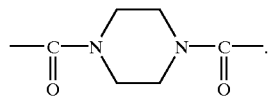
(vi)

2. A pivot assembly bearing in which oil composition is sealed, said oil composition comprising:

(A) a fluorinated ether-based oil composed of a fluorinated ether of the general formula (vii)

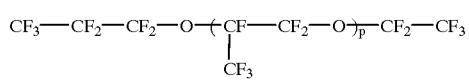
(vii)

wherein p is an integer of 6 to 100; and (B) a fluorinated ether aliphatic diamide additive of the general formulae (ii) and (iii)

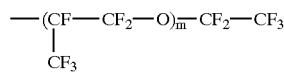
(ii)

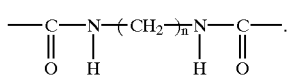
(iii)

3. A pivot assembly bearing in which an oil composition is sealed, said oil composition comprising:

(A) a fluorinated ether-based oil composed of a fluorinated ether of the general formula (vii)

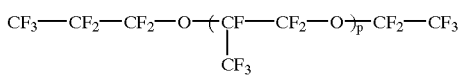
(vii)

wherein p is an integer of 6 to 100; and (B) a fluorinated ether alicyclic diamide additive of the general formulae (ii) and (iv)

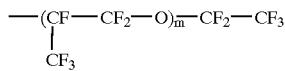
(ii)

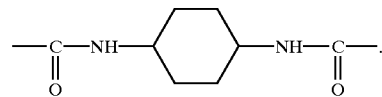
(iv)

4. A pivot assembly bearing in which an oil composition is sealed, said oil composition comprising:

(A) a fluorinated ether-based oil composed of a fluorinated ether of the general formula (vii)

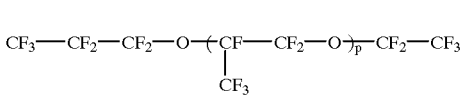
(vii)

wherein p is an integer of 6 to 100; and (B) a fluorinated ether aromatic diamide additive of the general formulae (ii) and (v)

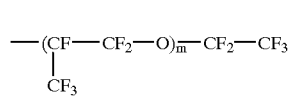
(ii)

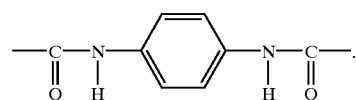
(v)

5. A pivot assembly bearing in which an oil composition is sealed, said oil composition comprising:

(A) a fluorinated ether-based oil composed of a fluorinated ether of the general formula (vii)

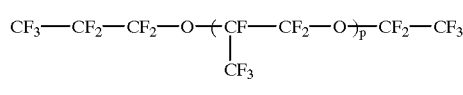
(vii)

wherein p is an integer of 6 to 100; and (B) a fluorinated ether cyclic diamide additive of the general formulae (ii) and (vi)

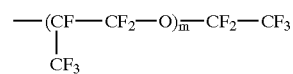
(ii)

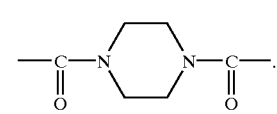
(vi)

6. A pivot assembly bearing as recited in claim 1 in which an oil composition is sealed, wherein the ratio by weight between the fluorine-based oil (A) and the additive (B) is from 80 to 99.1:20 to 0.1.

* * * * *